(No Model.)

C. L. CAIRNS.
CENTRIFUGAL APPARATUS.

No. 476,979. Patented June 14, 1892.

Witnesses
Chas H. Smith
J. Stait

Inventor
Charles L. Cairns
per Lemuel W. Serrell
atty

THE NORRIS PETERS CO., PHOTO-LITHO., WASHINGTON, D. C.

UNITED STATES PATENT OFFICE.

CHARLES L. CAIRNS, OF JERSEY CITY, NEW JERSEY.

CENTRIFUGAL APPARATUS.

SPECIFICATION forming part of Letters Patent No. 476,979, dated June 14, 1892.

Application filed March 12, 1892. Serial No. 424,615. (No model.)

*To all whom it may concern:*

Be it known that I, CHARLES L. CAIRNS, a citizen of the United States, residing at Jersey City, in the county of Hudson and State of New Jersey, have invented an Improvement in Centrifugal Apparatus, of which the following is a specification.

This improvement is especially intended for centrifugal clothes-drying machines; but it may be availed of in any other centrifugal device.

In centrifugal apparatus inequality in the position of the clothes or other articles in the basket or holder prevents the uniform and steady rotation of the basket, causing the spindle and basket to wabble or vibrate more or less. Efforts have been made to allow for this vibration of the spindle by placing springs at the bearings of the spindle-socket, and such spindle-socket has also been provided with a ball-bearing upon which the socket could swing in accommodating itself to the vibrations of the spindle, and a reference is hereby made to my patent, No. 408,791, granted August 13, 1889.

My present invention is made for simplifying the construction of the yielding bearings for the spindle-socket and for rendering such yielding bearings sufficiently compact for the upper of such bearings to be within the cylindrical pulley for the driving-belt.

Figure 1:
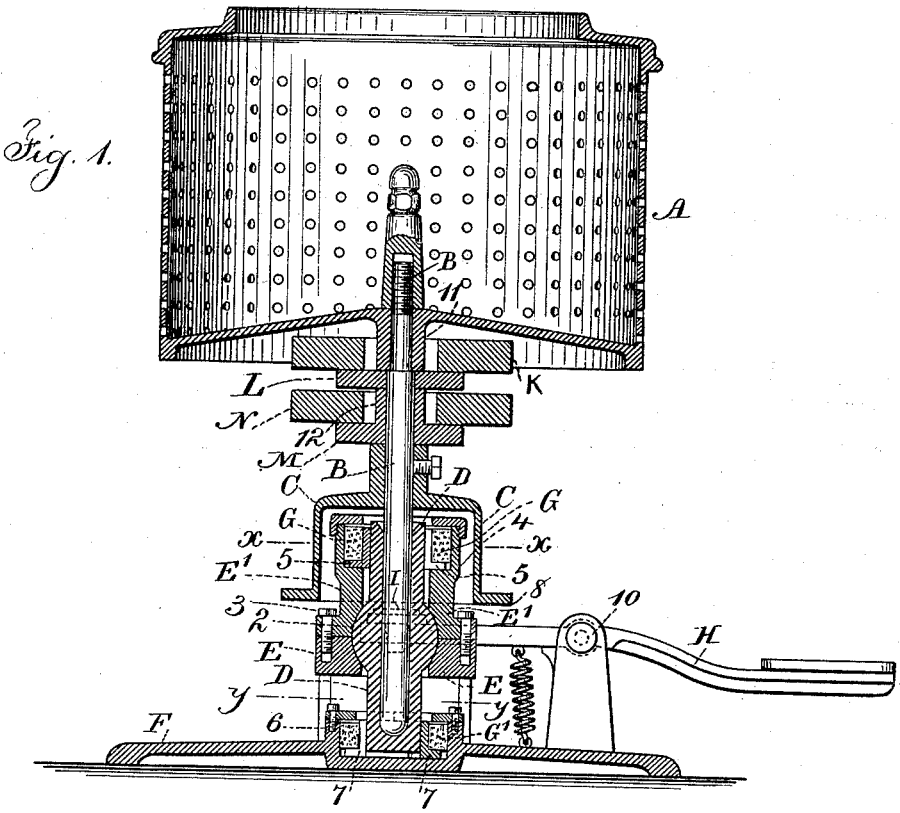
Figure 2:
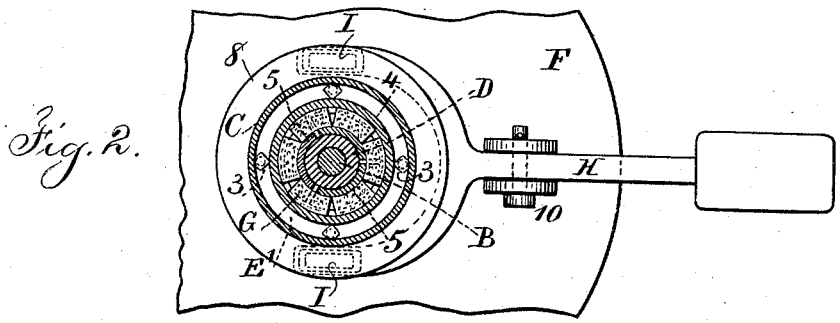
Figure 3:
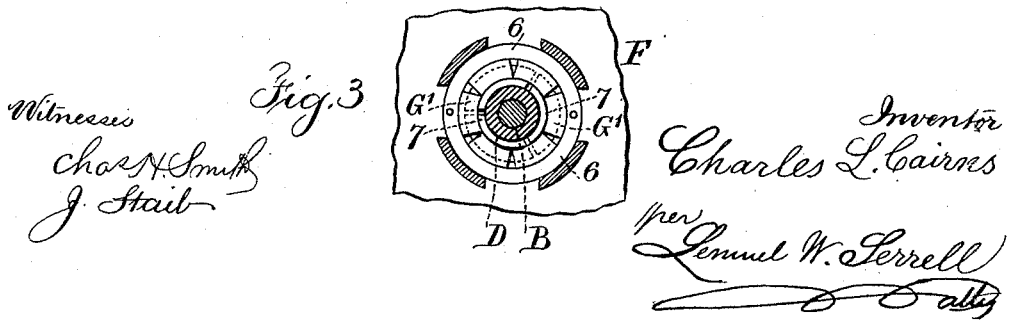

In the drawings, Figure 1 is a vertical section of the centrifugal apparatus. Fig. 2 is a sectional plan view at the line $x\ x$ of Fig. 1; and Fig. 3 is a sectional plan view at the line $y\ y$, with the cap-plates for the lower set of springs removed.

The basket or holder A is of any desired character and of perforated material, and the spindle B is vertical and connected, as usual, to the bottom of the basket, and upon this spindle is a driving-pulley C, the hub and disk or arms of which are at the upper end, so that the cylindrical portion of such driving-pulley extends downwardly and surrounds the spindle-sockets and its supports, as hereinafter described.

The spindle-socket D is tubular and provided with a ball enlargement 2, forming a bearing upon which the spindle-socket is sustained by the supports or bearings E and E', which are circular, and the bearing E' is of a size adapted to pass up within the driving-pulley C, and the bearing E is made with a frame or legs extending down and connected to the base-plate F, and the bearing E' is bolted to the bearing E by any suitable bolts 3, and the bearings E E', having the zone-shaped recesses for the ball-bearing 2, do not come into contact with the cylindrical parts of the spindle-socket D, and there is a freedom for motion of the spindle-socket as it rocks upon its ball and supports or bearings, according to the vibration that may be given to the spindle B as it is rotated. The upper bearing E' is extended up as a cylinder 4 within the driving-pulley C and at a sufficient distance therefrom to allow for the movement of the respective parts, and within this cylinder 4 springs G are placed surrounding the upper part of the spindle-socket D, and I find it advantageous to make use of india-rubber for these springs, because they can be in the form of blocks that are packed in at a slight distance apart, as seen in Fig. 2, and there are between the ends of the springs G and the upper portion of the spindle-socket D cylinder-sections 5, that prevent the direct contact of the springs with the spindle-socket, and these cylinder-sections are pressed up against the spindle-socket with sufficient force to support this end of the spindle-socket, but at the same time the springs yield freely as the spindle-socket and the cylinder-sections 5 vibrate under the action of the basket and spindle in consequence of inequalities in the weight within the basket, and at the lower end of the bearing E and upon the base-plate F the ring 6 forms an external support to the springs G', which are similar to the springs G and are packed in between the ring 6 and the cylinder-section 7, and these springs G' and cylinder-sections 7 act at the lower end of the spindle-socket D in the same way that the springs G and cylinder-sections 5 act at the upper end of such spindle-socket, and the parts are entirely out of the way and no injury results to the belt should the same slip off the pulley, and the parts are easily constructed, so as to be concentric and uniform.

The driving-pulley C is provided with a flange 8 at the lower end thereof for the two-fold purpose of lessening the risk of the belt slipping off and for applying a brake to stop the rotation of the centrifugal separator when desired, and with this object in view I provide a lever H, pivoted at 10 upon the base-plate F and having a fork beneath the flange 8, and upon this fork there are brake-shoes I, that are adjacent to the under side of the flange 8, and when the outer end of the lever is depressed by the foot or otherwise these brake-shoes I lift the centrifugal separator slightly, causing the pulley to rub upon the brake-shoes, and in so doing the rotation of the apparatus is arrested.

In centrifugal apparatus loose rings have been provided surrounding the upper end of the axis within the basket which rings under the vibratory action produced by an unequal load in the basket change their positions so as to act as balances in the rotation of the basket; but these rings have heretofore occupied valuable space within the basket or else have been applied in such a manner as not to act independently of each other. By this part of my improvement I am able to utilize the space immediately below the basket by applying an upper ring K around the hub 11 and within the conical bottom of the basket A, immediately below which is a disk L for supporting said ring K, and this disk L is held up by the hub 12 of the disk M, which disk M also supports a second ring N; or where economy of space is especially desirable the upper end of the pulley C may take the place of the disk M. Under these conditions either ring can move without the movement of one ring interfering with or changing the position of the other ring, and these rings acting closely adjacent to the bottom of the basket exert their force upon the spindle itself, and the tendency of the vibration of the spindle is to throw the rings toward the side of the basket that is the lightest, and in so doing bring the spindle of the basket and the axis of the weight to coincide, so that the vibration of the spindle may be lessened or avoided, and when the basket is evenly weighted the rings K and N adjust themselves to opposite sides of the spindle, so as to balance each other. Where the friction-brake acts against one side of the driving-pulley it is liable to produce wear of the spindle and socket. Where the brake simply acts to lift the centrifugal separator, as in my improvement, there is no lateral wear, and the spindle is lifted off the step or bearing at the bottom of the socket, thus entirely relieving wear and causing a stoppage of the rotation by the friction on the pulley resulting from gravity.

I claim as my invention—

1. The combination, with the basket, spindle, and pulley in a centrifugal machine, and the tubular socket for the spindle having a ball-bearing, of the cylindrical bearings E and E', recessed for the reception of the ball of the spindle, the base-plate F, to which the bearing E is connected, said upper bearing E' passing into the cylinder of the driving-pulley, and springs within the bearings E and E' and cylinder-sections between the springs and the spindle-socket near the respective ends, substantially as set forth.

2. The combination, in a centrifugal machine, with the basket, spindle, cylindrical driving-pulley, and spindle-socket having a ball projection, of recessed bearings surrounding the ball of the socket and bolted together, the upper bearing having a cylinder passing up into the pulley, and springs above and below the ball and between the cylinders of the bearings and spindle-socket, substantially as set forth.

3. The combination, in a centrifugal machine, with the basket, the spindle, and spindle-socket, of a driving-pulley the cylindrical portion of which extends down around the spindle-socket and is provided with a flange at the lower edge, a lever, and brake-shoes upon such lever acting against the under side of the flange on the driving-pulley to lift the separator, and bearings for the spindle-socket extending up within the pulley, substantially as set forth.

Signed by me this 8th day of March, 1892.

CHARLES L. CAIRNS.

Witnesses:
GEO. T. PINCKNEY,
WILLIAM G. MOTT.